United States Patent Office 2,995,858
Patented Aug. 15, 1961

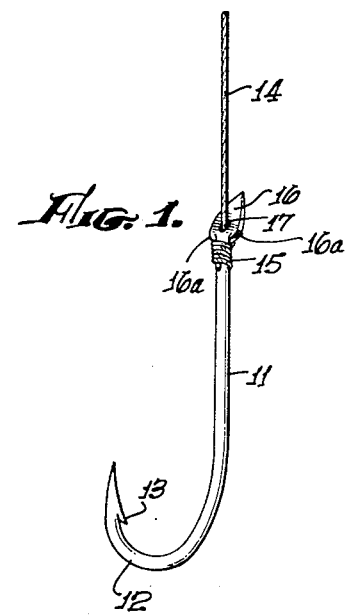
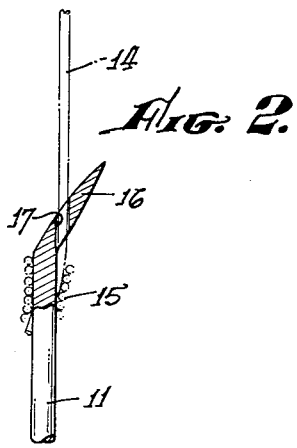
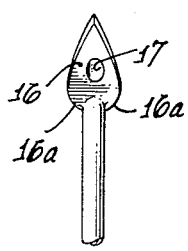
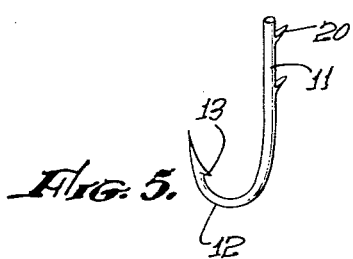
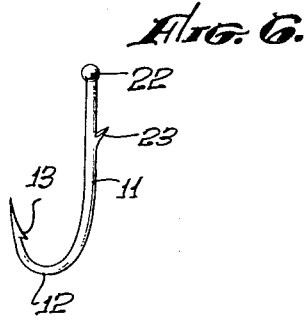

2,995,858
FISH HOOK
William G. Rathmann, 8474 Van Ness Ave.,
Inglewood 4, Calif.
Filed June 9, 1958, Ser. No. 740,730
2 Claims. (Cl. 43—44.8)

The present invention relates generally to fishing gear and more especially to hooks of the type used for trout fishing.

It requires considerable experience and attention to detail to become a successful trout fisherman and it has been found that one of the most important factors in trout fishing is the elimination of anything that detracts from the natural appearance of the bait used. The presence near the bait of easily visible objects, such as part of the hook, or light-reflective objects, such as a large knot, even though of light colored or transparent material, are all easily enough seen that the game fish is rendered suspicious and stays away from the bait. For this reason, various precautions are commonly taken by fishermen. One of them is to cover the hook completely with the bait. Another one is to use a transparent leader or snell between the opaque line and the hook itself, this leader being designed to be as inconspicuous as possible. Similarly, it is desirable to eliminate a large knot in the leader at a position anywhere near the hook.

The conventional type of hook most commonly used has an eye at one end of the shank which is formed by bending the shank into a circular ring. This eye is provided to render attachment of the leader to the hook as simple and easy as possible. While the eye makes it possible to easily effect a connection between the leader and the hook, the eye is necessarily of such a size that it ordinarily destroys many types of bait. It is not possible to cover the eye by pulling a salmon egg or worm over the eye because the distance across the ring is usually five or more times the shank diameter and the size of the eye is such as to tear the bait to the point where it can no longer completely conceal the hook. The presence of a knot in the leader at the eye only compounds the difficulty since it adds to the size of the structure over which the bait must pass.

In an effort to improve this situation, many experienced trout fishermen resort to snelling, that is, they connect the leader directly to the shank of the hook by wrapping the leader around the smooth shank. This eliminates a bulky knot at the eye and also places the accumulation of leader at a point where it is covered by the bait which at the same time conceals the hook.

Thus it becomes a general object of my invention to provide a fish hook designed especially for trout fishing which is capable of complete concealment within the bait and which has no large eye or other portion which is large enough to destroy the effectiveness of the bait in concealing the hook.

Another object of my invention is to provide a fish hook with which it is possible to eliminate a bulky knot at or near the hook, which, when unconcealed, is seen by the fish.

A further object of my invention is to provide a fish hook which not only does the least possible amount of damage to the bait, thus preserving its natural appearance as far as possible, but which is designed to hold the bait upon the shank in a position to completely conceal the hook.

A further object of my invention is to design a fish hook to which a leader can be attached in the field by the fisherman without the necessity of resorting to fastening means, such as glue or cement, which are not ordinarily available or practical under field conditions.

These and other objects of my invention have been attained in a fish hook having a shank with a straight section around which a leader can be wrapped and a hook on one end of the shank, by providing at the other end of the shank an enlargement which is large enough to prevent the leader from slipping off but which is small enough to pass through the bait without any substantial damage to the bait. It has been found by experience that if the enlargement has a maximum transverse dimension of not more than approximately twice the diameter of the shank that the enlargement offers adequate engagement with the leader to make the connections secure and at the same time does no material harm to the bait. In a preferred form of my invention, this enlargement takes the form of a flat, sharpened terminal portion of the shank which is preferably inclined at an angle thereto in order to provide a barb engageable with the bait to hold the bait against movement along the shank towards the hook. I also prefer to place an axially directed hole in this enlarged portion through which the leader can pass, the hole being so designed so as to avoid any cutting or abrading action on the leader.

How these objects and advantages of my invention, as well as others not specifically mentioned herein are attained, will be more readily understood by reference to the following description and to the annexed drawing, in which:

FIG. 1 is a side elevation of a fish hook embodying my invention, shown attached to a leader.

FIG. 2 is an enlarged fragmentary view showing the upper end of the shank and the enlargement thereon in section.

FIG. 3 is a top plan view of the hook in FIG. 1.

FIG. 4 is a front elevation of the upper end of the hook alone in FIG. 1.

FIG. 5 is a side elevation of a hook showing a modified form of my invention.

FIG. 6 is a side elevation of a fish hook showing still another form of my invention.

It should be kept in mind that the present invention is concerned only with small sizes of hooks—typically 6 to 14—used for trout, that are much smaller than the illustrations.

Referring now to the drawing, especially to FIGS. 1 and 2, there is shown a fish hook having a shank 11 on one end of which is hook 12 provided with barb 13, which may be of any suitable size. Shank 11 has a straight section to which leader 14 may be attached by several turns of the leader around the shank, as indicated at 15.

The upper end of shank 11 terminates in a flattened enlargement 16 which is rather generally triangular or arrow shaped since it is preferred that the outer end of the enlargement 16 be sharpened to act as a barb engageable with the bait when pulled up over the enlargement. The flattened end is directed upwardly and outwardly so that upon engagement with the bait, the bait is held against sliding downwardly along the shank toward hook 12. To be most effective as a barb, the enlargement 16 is preferably inclined relative to the shank, as may be seen clearly in FIG. 2.

Ordinarily the leader is smaller than the shank, having a diameter approximately one-half the diameter of the shank of the hook, or possibly less if a very fine leader is used. However, assuming these typical values, the overall dimension of the turns around the shank, as indicated at 15, is approximately twice the diameter of the shank, usually some what less but possibly slightly more. Consequently the enlarged portion 16 has a maximum transverse dimension or width of about twice the diameter of the shank in order that it is not appreciably larger than the overall dimension of the turns 15. This size of the enlargement is sufficient to form shoulders 16a at the lower end of the enlargement that perform the function of preventing the leader from sliding off the end of the hook and at the same time the increase in size is not great enough to break up or destroy the bait as it is slid over the shank.

As may be seen from the drawing, the arrow-shaped enlargement 16 is provided with an opening 17 which has its axis extending parallel to the axis of shank 11, the opening being offset from but preferably as close as possible to the shank. Opening 17 is designed to receive the leader as it extends upwardly from the shank, as shown in FIGS. 1 and 2. This opening has the advantage that it is easier to make a secure connection between the leader and the hook when this hole is present to guide and position the running end of the leader. Accordingly, this design of hook requires less experience to be used successfully and without danger of losing any fish than the forms described later.

FIG. 5 illustrates a modified form of my invention in which the enlargement at the end of shank 11 is provided by barb 20 which extends outwardly and upwardly from the shank when the hook is in the position shown. Barb 20 extends out from the shank for a distance approximately equal to the shank diameter to provide a shoulder against which the turns of the leader engage to prevent the leader from slipping off the hook. When the leader is snelled snugly around the smooth portion of the shank, it can be firmly held by a shoulder projecting no further than one diameter of the hook so that the total overall size of the hook at this point, including the leader, can be held down to approximately twice the shank diameter. Barb 20 is inclined in a direction to engage bait which is pulled up over the shank and prevent the bait from sliding downwardly along the shank toward the hook 12 and thus keeps the bait in a position to completely cover and hide the hook.

By comparison with conventional barbs, barb 20 is larger and less sharp. The added size is required to provide a shoulder engaged by the leader. The barb is blunt at the point and rounded on the underside to avoid cutting the leader.

FIG. 6 shows still another variational form of my invention in which shank 11 terminates in an enlargement 22 formed as a smooth round bead on the end of the shank. The diameter of the bead 22 is made approximately twice the diameter of the shank, thus providing shoulder means which project outwardly around the shank for approximately the same distance as the thickness of the leader. This shoulder means engages the leader to prevent it from sliding off the end of the shank and yet is not sufficiently larger than the shank itself to do any materially greater damage to the bait as it is pulled upwardly along the shank.

This hook may or may not have a barb 23, but it is preferable to provide such a barb in order to assist in holding the bait up on the shank and prevent it from sliding down and exposing the hook. This function is provided by the enlargement at the end of the shank in the forms of the invention previously described. The barb 23 would also prevent the leader from sliding downwardly on the shank.

It will be understood that shank 11 can be made longer or shorter as desired in order to best hold the particular bait used.

From the foregoing description it will be apparent that various changes may be made in the details of design and arrangement of the parts of my improved fish hook without departing from the spirit and scope of my invention. Accordingly it is to be understood that the foregoing is considered as being illustrative of, rather than limitative upon, the invention as defined by the appended claims.

I claim:

1. A trout hook comprising a shank having a straight section around which a leader can be wrapped, a hook on one end of the shank; and an enlargement on the shank at the other end thereof to prevent the leader from slipping off, said enlargement comprising a flattened portion of the shank that is inclined upwardly and outwardly from the shank and has a sharpened point to engage and hold bait covering the shank and prevent the bait from sliding down to expose the shank, said flattened portion of the shank having a hole through which may pass the leader leaving the portion wrapped around the shank, the axis of the hole being substantially parallel to the axis of the shank.

2. A trout hook as claimed in claim 1 in which the hole is substantially tangent to the shank.

References Cited in the file of this patent

UNITED STATES PATENTS

| | | |
|---|---|---|
| 319,655 | Wright | June 9, 1885 |
| 754,892 | Robbins | Mar. 15, 1904 |
| 805,284 | Greenway et al. | Nov. 21, 1905 |
| 1,093,000 | Kinsey | Apr. 14, 1914 |
| 1,895,301 | Vandermark | Jan. 24, 1933 |

FOREIGN PATENTS

| | | |
|---|---|---|
| 1,433 | Great Britain | Jan. 14, 1884 |
| 6,551 | Great Britain | May 4, 1887 |
| 32,930 | Norway | Nov. 14, 1921 |
| 226,687 | Great Britain | Jan. 1, 1925 |
| 964,991 | France | Feb. 8, 1950 |